(12) United States Patent
Wylie

(10) Patent No.: US 7,536,863 B1
(45) Date of Patent: May 26, 2009

(54) COMBINED CYCLE

(75) Inventor: Roger Wylie, Marble Falls, TX (US)

(73) Assignee: Wylie Inventions, Inc, Marble Falls, TX (US)

( * ) Notice: Subject to any disclaimer, the term of this patent is extended or adjusted under 35 U.S.C. 154(b) by 0 days.

(21) Appl. No.: 12/218,335

(22) Filed: Jul. 14, 2008

(51) Int. Cl.
*F02C 3/28* (2006.01)

(52) U.S. Cl. .......................................... 60/780; 290/52
(58) Field of Classification Search .............. 290/2, 290/52; 60/780, 781, 39.12
See application file for complete search history.

(56) References Cited

U.S. PATENT DOCUMENTS

| | | | | |
|---|---|---|---|---|
| 4,381,419 A * | 4/1983 | Wylie | ...................... | 585/828 |
| 5,649,416 A * | 7/1997 | Moore | ...................... | 60/39.15 |
| 5,865,023 A * | 2/1999 | Sorensen et al. | ............... | 60/775 |
| 6,167,692 B1 * | 1/2001 | Anand et al. | ............. | 60/39.182 |
| 6,244,033 B1 * | 6/2001 | Wylie | .......................... | 60/783 |
| 6,637,183 B2 * | 10/2003 | Viteri et al. | .............. | 60/39.182 |
| 6,792,759 B2 * | 9/2004 | Rollins, III | ................... | 60/773 |
| 6,820,428 B2 * | 11/2004 | Wylie | .......................... | 60/772 |
| 6,910,335 B2 * | 6/2005 | Viteri et al. | ................... | 60/786 |
| 6,966,190 B2 * | 11/2005 | Wylie | .......................... | 60/780 |
| 7,036,337 B2 * | 5/2006 | Wylie | .......................... | 62/625 |
| 7,416,137 B2 * | 8/2008 | Hagen et al. | ............... | 237/12.1 |
| 7,441,399 B2 * | 10/2008 | Utamura | ..................... | 60/39.3 |

* cited by examiner

*Primary Examiner*—Nicholas Ponomarenko
(74) *Attorney, Agent, or Firm*—Murray Nadler

(57) ABSTRACT

A combined cycle wherein part of the gas turbine exhaust gas stream is recycled to the gas turbine and the remainder of the gas turbine exhaust gas stream is expelled from the cycle. The power output of the combined cycle is increased by increasing fraction of gas turbine exhaust gas that is recycled to the gas turbine and the power output of the combined cycle is reduced by reducing the fraction of gas turbine exhaust gas that is recycled to the gas turbine.

11 Claims, 1 Drawing Sheet

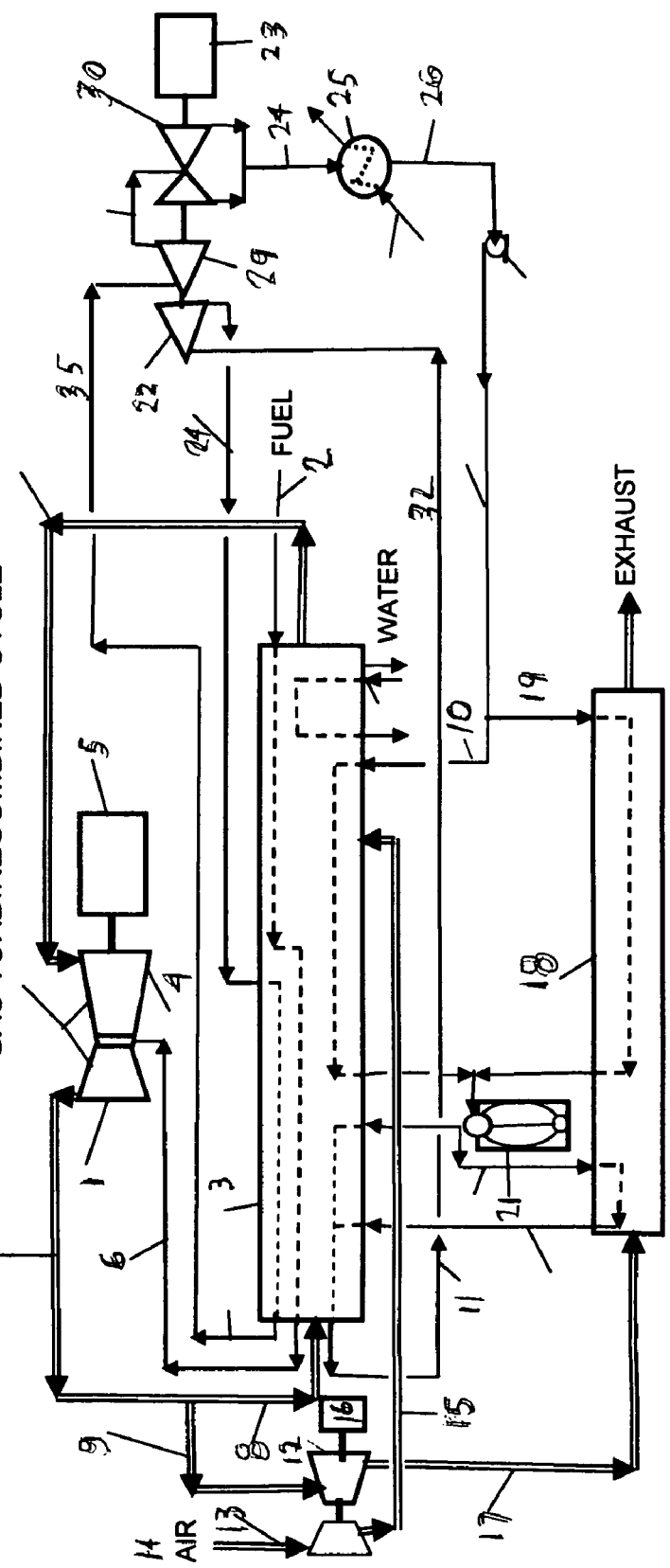

COMBINED CYCLE

FIELD OF THE INVENTION

This invention relates generally to combined cycles for generating electric power.

BACKGROUND OF THE INVENTION

Combined cycles are currently the preferred process for generating electric power on a large scale. A combined cycle includes two power generation systems: a gas turbine fired by a fuel gas, commonly natural gas that drives an electric power generator and a steam turbine powered by steam that drives a second power generator. The steam is raised with heat recovered from gas turbine exhaust gas. The gas turbine also drives a compressor that pumps ambient air into the gas turbine to burn the fuel gas stream.

Sensible heat in the exhaust gas stream from the gas turbine is recovered in a heat recovery unit by indirect heat transfer to a stream of water to convert the water to steam. The overall efficiency of a combined cycle, LHV of fuel to electric power for the gas and steam turbines is typically about 55% for air cooled turbines. Fuel heat rates for modern conventional combined cycles are typically about 6100 Btu/KWH (LHV). Typically, the gas turbine generates about 65% of the total electric power produced by the cycle and the steam turbine generates about 35%.

The exhaust steam from the steam turbine is condensed and recycled to the heat recovery unit to be converted to steam. Turbine exhaust gas, after it gives up sensible heat in the heat recovery unit is released to the atmosphere.

Ambient air is typically used with gas turbines, at about one atmosphere absolute pressure (14.7 PSIA). Firing temperatures in gas turbines currently range from about 2200 F to 2300 F. Power output increases with firing temperature but firing temperature is limited by turbine materials and need to limit NOX formation.

Improvements to the combined cycle are continually sought to improve fuel efficiency, to reduce capital cost, and to reduce pollutants released to the atmosphere in the exhaust gas, primarily NOX and CO2. The Wylie combined cycle, which is the subject of this invention, accomplishes these three objectives as well as improving efficiency and operating flexibility.

SUMMARY OF THE INVENTION

In the combined cycle of this invention, a Wylie combined cycle, part of the gas turbine exhaust gas stream is recycled back to the gas turbine compressor where it is combined with fresh ambient air. The recycled gas turbine exhaust is combined with fresh ambient air and the mixed gas stream is pumped into the gas turbine by the gas turbine compressor. The part of the turbine exhaust gas stream that is not recycled and this un-recycled part of the exhaust gas stream is expelled from the cycle after processing.

The suction pressure at the inlet to the gas turbine compressor in a Wylie combined cycle can be readily maintained substantially above one atmosphere absolute pressure. Raising gas turbine suction pressure raises gas turbine power output. Moreover, the suction pressure can be varied up or down to accommodate power output to prevailing system electric power demand.

The fresh ambient air stream is pumped into the recycle turbine exhaust stream using an air compressor. The mixed gas stream is pumped into the gas turbine by the gas turbine compressor. Fuel gas, commonly natural gas, is injected into gas turbine where it burns in the mixed ambient air and recycled gas turbine exhaust gas stream producing energy that drives the gas turbine. The gas turbine drives an electric generator that produce electric power. The gas turbine also drives the gas turbine compressor.

The fraction of the gas turbine exhaust gas stream that is to be recycled to the gas turbine flows to a heat recovery unit in which available sensible heat in the gas turbine exhaust gas stream is transferred by indirect heat exchange into a stream of water. The water steam is converted to steam. The steam is conveyed to a steam turbine. The steam turbine drives an electric generator that produces electric power.

In the preferred version of the Wylie combined cycle of this invention the air compressor that pumps the ambient air stream into the recycled turbine exhaust gas stream is driven by an expander. That expander is driven by the fraction of gas turbine exhaust gas stream that is not recycled to the gas turbine and that is subsequently expelled from the cycle. The exhaust gas from the air compressor expander is conveyed to a second heat recovery unit where available sensible heat in the expander exhaust gas is transferred by indirect heat exchange to a stream of water. That water stream is converted to steam. The steam is conveyed to the steam turbine along with steam raised with the recycled gas turbine heat recovery unit to produce electric power. The exhaust cooled expander gas stream from its heat recovery unit is expelled from the cycle.

Optionally, not all of the steam raised in the heat recovery units need to be fed into the steam turbine; some of the steam can be diverted for utility use. In a cogeneration version of the Wylie cycle none of the steam is fed to a steam turbine to produce power and all the steam produced is used for process utility applications.

Exhaust steam from the steam turbine is condensed to form the water streams that go to the heat recovery units, along with makeup boiler water.

BRIEF DESCRIPTION OF THE DRAWINGS

FIG. 1 is a simplified flow plan of the Wylie combined cycle of the present invention in its preferred mode.

DETAILED DESCRIPTION OF THE INVENTION

The following detailed description of Wylie combined cycle of this invention can be followed by referring to FIG. 1. FIG. 1 is simplified flow plan of the preferred mode of the Wylie combined cycle of this invention. All instrumentation, and ancillary facilities including control instrumentation are omitted from FIG. 1 to improve clarity.

The gas turbine 1 is fired with a mixed gas stream containing air, recycled gas turbine exhaust gas and a hydrocarbon fuel. The most commonly used fuel is natural gas. (The fuel can be injected separately directly into the gas turbine 1. This option is not shown in FIG. 1).

A preferred option (shown in FIG. 1) is to preheat the fuel gas stream 2 before injecting it into the gas turbine 1 in the recycle heat recovery unit 3 by indirect heat exchange against hot gas turbine exhaust in the recycle heat recovery unit 3. Preheating the fuel gas increases cycle fuel efficiency.

The gas turbine 1 produces shaft power that drives the gas turbine compressor 4 and the gas turbine electric power generator 5. The gas turbine compressor 4 pumps the mixed gas stream 6 made up of recycled gas turbine exhaust gas, air and fuel gas into the gas turbine 1. The air in the mixed gas stream provides oxygen needed to burn the fuel stream.

The exhaust gas stream 7 from the gas turbine 1 is divided into two streams: one stream 8 is ultimately recycled back to the gas turbine 1; the second stream 9 is ultimately expelled from the cycle.

The gas turbine exhaust gas stream that is to be recycled back to the gas turbine 8 is conveyed into a heat recovery unit 3 where its available sensible heat is transferred to a water stream 10. The heated water stream is converted to high pressure steam 11. The temperature of the gas turbine exhaust gas is about 1100 F.

The gas turbine exhaust stream fraction that is not recycled to the gas turbine and is to be expelled from the cycle 8 is fed into an expander 12. The expander 12 produces shaft power used to drive an air compressor 13. The air compressor pumps filtered ambient air 14 into turbine exhaust stream fraction 15 that is to be recycled to the gas turbine gas compressor 1 to form the mixed gas feed to the gas turbine. Sufficient ambient air is pumped into the mixed gas stream 8 to provide oxygen required to burn the fuel gas stream in the gas turbine 1.

Preferably, the compressed air from the air compressor 13 is cooled in a cooler (not shown) to condense moisture from the air before the air is mixed into the recycled exhaust gas stream 8. The condensate is discarded or used as process water.

The expander 12 produces more shaft power than is required to pump the required amount of ambient air. One option is to use the excess shaft power generated by the expander to produce electric power. Both the amount of excess shaft power produced by the expander and the expander speed are variable. Accordingly, the expander generator is a DC generator 16, since DC generators can accommodate the variations 16.

In the preferred mode version of the Wylie combined cycle of this invention, shown in FIG. 1, the exhaust gas stream 17 from the air compressor expander 12 is conveyed into a heat recovery unit 18 where available sensible heat in the expander exhaust gas 18 is transferred to a stream of water 19 by indirect heat exchange. The heated water is converted to high pressure steam in a boiler 21. The expander exhaust gas from the heat recovery unit 18, after giving up its recoverable sensible heat is expelled from the cycle.

The heated water streams from the two heat recovery units that are converted to high pressure steam in the steam boiler 21. High pressure steam pressure typically is in the range of 2000 to 2500 psig.

The high pressure steam from the boiler 21 is superheated in the recycle gas heat recovery unit 3 by indirect heat exchange against gas turbine exhaust gas to be recycled.

The boiler and the heat recovery units can be fired with supplemental fuel to produce additional high pressure steam or to raise steam pressure and temperature (This option is not shown on FIG. 1).

Heat recovery units suitable for the Wylie combined cycle are described in Wylie U.S. Pat. No. 6,244,033.

High pressure steam from the boiler 21, after superheating, is conveyed to a steam turbine 22. The steam turbine drives an electric generator 23 that produces electric power. The exhaust steam stream from the steam turbine 24 is condensed in a condenser 25 to form a water stream 26 that split into two streams 19 fed into heat recovery unit 18 and stream 10 fed into heat recovery unit 3, to be converted to high pressure steam.

Optionally (not shown in FIG. 1), some of the steam raised in the boiler can be diverted from the steam turbine for process use. In another optional cogeneration version of the Wylie cycle, all of the steam generated is used for process utility applications.

The steam turbine 22 as shown in FIG. 1 is a three turbine steam turbine train comprised of a high pressure steam turbine 22, an intermediate steam turbine 29, and a low pressure turbine 30 connected for series steam flow. The steam turbine train drives the electric power generator 23. The high pressure steam 32 is fed into the inlet of the high pressure steam turbine 22. Exhaust steam from the high pressure turbine 24, now at intermediate pressure, is conveyed to the recycle heat recovery unit 3 where it is reheated by indirect heat exchange against gas turbine exhaust gas. The reheated intermediate steam stream 35 is fed into the inlet of the intermediate steam turbine 29. The exhaust steam from the intermediate steam turbine 29 is fed into the inlet of the low pressure steam turbine 30. The exhaust steam 29 from the low pressure condensing turbine is condensed in the condenser 25 against cooling water or air 34 and recycled to the heat recovery units 3 and 18 to complete the steam/water circuit.

Operating the Wylie Combined Cycle

An advantage of the Wylie combined cycle is that the power output of the gas turbine can be readily varied by increasing or decreasing the fraction of the gas turbine exhaust gas stream that is recycled to the gas turbine. The suction pressure at the inlet of the gas turbine compressor increases as the recycle rate is increased and the mass flow rate of mixed gas pumped into the gas turbine by the gas turbine compressor increases. The electric power output that is produced by the gas turbine is directly proportional to the mass flow rate of gas that is pumped into the gas turbine by the gas turbine compressor.

Also increasing the gas turbine exhaust recycle increases the exhaust gas stream rate which increases the steam produced by the steam turbines to generate more electric power.

As gas flow rate to the gas turbine is increased fuel gas feed rate is also increased proportionally to maintain specified turbine firing temperature, and the air pumping rate is increased proportionately to fuel gas rate to completely burn the additional fuel gas.

With conventional combined cycles, to reduce power output below design rate, to accommodate to prevailing load requirements, the firing temperature in the gas turbine must be reduced. Reducing turbine firing temperature reduces fuel efficiency. In contrast, when the power output of the Wylie combined cycle is reduced to meet prevailing power demand the amount of gas turbine exhaust gas that is recycled is reduced; firing temperature is not reduced. Fuel rate and air rates are reduced. Fuel efficiency is not impaired.

Conventional combined cycles operate typically with gas turbine suction pressure at about one atmospheric pressure absolute. A Wylie combined cycle can operate with considerably higher pressure at the suction inlet of the gas turbine compressor—typically two to four atmospheres absolute pressure—simply by increasing gas turbine exhaust recycle rate. Accordingly, the Wylie combined cycle can produce say two to four times the electric power than a conventional combined cycle with similar equipment on short notice. Wylie cycle gas turbine systems encounter higher operating pressures and gas flow rates than conventional gas turbines. Accordingly, Wylie turbines require appropriate heftier mechanical design than conventional combined cycle gas turbines systems to withstand higher stresses and flow rates.

Commercial gas turbines that are currently on the market, suitably mechanically upgraded for higher pressure and flow rates, are suitable for the Wylie combined cycle. GE is a leading maker of conventional gas turbines. One of GE's most popular turbines is the F9A. (See GE Report GER- 3801). Turbine firing temperature for the F9A is 2350 F, and its compression ratio is 15.1/1. The pressure at the compressor suction inlet is one atmosphere absolute. At 60 F ambient air temperature, and using natural gas as the fuel, the F9A produces 240 MW of electric power. The accompanying steam turbine produces 127 MW of additional power for a total combined cycle power output of 367 MW. The heat rate is about 6,150 Btu/KWH (LHV).

Using a suitably modified F9A GE gas turbine in the Wylie combined cycle, and setting the gas turbine compressor suction pressure at 43 PSIA, the gas turbine generator produces about 1400 MW. Sufficient steam is raised from heat recovered from gas turbine exhaust gas in the heat recovery to produce about 600 MW additional power with the steam turbine. The overall heat rate of this Wylie cycle is about 6100 BTU/KWH (LHV). In this mode, about 35% of the gas turbine exhaust gas is vented to the atmosphere and 65% is recycled. The gas turbine exhaust gas steam exits the gas turbine at about 30 PSIA and about 1000 F to 1100 F.

GE has recently upgraded their F9A gas turbine designated the MS9001H gas turbine. The metal in the turbine inlet is cooled with steam rather than air which permits higher firing temperature. Compression ratio has been increased to 17:1. Air flow capability has been increased. In the GE design mode their new gas turbine generates about 335 KW and the matched steam turbine generates about 185 KW for a total power output of 520 KW. The heat rate is improved to about 5700 BTU/KWH (LHV). When this new gas turbine is used in the Wylie combined cycle and the gas turbine compressor inlet suction pressure is set at 60 PSIA, firing at the same higher temperature, the power output of the gas turbine generator is 1410 MW and the power produced by the steam turbine generator is 800 MW. Total power output is 2210 MW. The overall heat rate of this Wylie cycle in this configuration is about 5860 BTU/KWH (LHV).

The $CO_2$ concentration in the gas turbine exhaust gas stream expelled from the Wylie combined cycle is 2.7 times higher than the $CO_2$ concentration in the exhaust gas from a conventional combined cycle depending on the recycle to vent ratio. In future when sequestration of $CO_2$ becomes mandatory, to reduce global warning, this will be a significant advantage for the Wylie combined cycle because the cost of sequestering $CO_2$ is inversely proportional its concentration.

I claim:

1. A combined cycle system for generating electric power that is comprised of the following equipment:
   a gas turbine;
   a gas turbine compressor;
   a gas turbine generator;
   a gas turbine exhaust gas recycle heat recovery unit;
   an expander;
   an air compressor;
   a steam turbine;
   a steam turbine generator:
wherein the combined cycle process comprises the following steps:
   compressing a gas stream that contains oxygen using the gas turbine compressor;
   feeding the compressed gas stream into the gas turbine;
   injecting a stream of fuel gas into the gas turbine and burning the fuel gas in the gas turbine to produce gas turbine shaft power;
   applying the gas turbine shaft power produced to drive the gas turbine compressor;
   applying gas turbine shaft power to drive the gas turbine generator to produce electric power;
   producing a gas turbine exhaust gas stream that is emitted from the gas turbine;
   dividing the gas turbine exhaust gas stream into two parts—one part to eventually be recycled to the gas turbine and the other part to eventually be expelled from the cycle;
   conveying the part of the gas turbine exhaust gas stream to be expelled from the cycle to the expander;
   expanding the gas turbine exhaust gas stream to be expelled in the expander to produce expander shaft power, and an expander turbine exhaust gas stream that is discharged from the expander;
   applying shaft power produced by the expander to drive the air compressor;
   using the air compressor to pump a stream of ambient air into the stream of gas turbine exhaust gas stream fraction that is to be recycled to the gas turbine to form the gas stream containing oxygen that is fed into the gas turbine compressor and then pumped into the gas turbine;
   conveying the part of the gas turbine exhaust gas stream to be recycled to the recycle heat recovery unit;
   in the heat recovery unit transferring available sensible heat in the gas turbine exhaust gas to a water stream that is fed into the recycle heat recovery unit;
   converting that water stream to a stream of steam;
   conveying that steam stream to the steam turbine to drive the steam turbine to produce steam turbine shaft power and an exhaust steam stream;
   applying steam turbine shaft power to drive the steam turbine electric generator to produce electric power;
   condensing the exhaust steam produced by the steam turbine to form a stream of water;
   feeding part of the stream of water to the recycle heat recovery unit as the water stream that is converted to steam.

2. The combined cycle of claim 1 wherein the cycle equipment additionally includes an expelled gas turbine exhaust gas heat recovery unit and the process includes the following additional steps:
   the expander exhaust gas stream is conveyed to the expelled gas turbine exhaust gas heat recovery unit where its available sensible heat is transferred to a stream water fed into the expelled gas heat recovery unit;
   the water stream heated in the expelled gas heat recovery unit is converted to steam and the expander exhaust gas is cooled and expelled from the cycle;
   the steam stream from the expelled gas heat recovery unit is conveyed to the steam turbine along with steam generated in the recycle gas heat recovery unit;
   part of the condensate stream from the steam turbine is fed into the expelled gas heat recovery unit as the water stream that is their converted to steam.

3. A combined cycle for generating electric power that is comprised of a gas turbine that produces a gas turbine exhaust gas stream wherein part of the gas turbine exhaust gas stream is expelled from the combined cycle and part of the gas turbine exhaust gas stream is recycled back to the gas turbine.

4. The combined cycle of claim 2 wherein the water streams heated in the expelled gas heat recovery unit and the recycle gas heat recovery unit are converted to steam in a steam boiler.

5. The combined cycle of claim 1 wherein the steam turbine is a steam turbine train comprised of two or more steam turbines through which steam flows in series with pressure falling from turbine stage to turbine stage moving downstream.

6. The combined cycle of claim 1 that additionally includes an expander electric generator wherein expander shaft power is applied to drive the expander electric generator to produce electric power.

7. The combined cycle of claim 1 wherein the fuel gas stream is heated in the recycle gas heat recovery unit before being injected into the gas turbine.

8. The combined cycle of claim 1 wherein the power output of the combined cycle is reduced by reducing the part of the gas turbine exhaust gas stream that is recycled to the gas turbine and the power output of the combined cycle is increased by increasing the part of the gas turbine exhaust gas stream that is recycled the gas turbine.

9. The combined cycle of claim 1 wherein all or part of the steam produced from the boiler feed water streams is diverted from the steam turbine.

10. The combined cycle of claim 1 wherein the gas turbine is an axial turbine.

11. The combined cycle of claim 1 wherein the gas turbine is a radial turbine.

* * * * *